Oct. 18, 1932.　　　　R. E. RICH　　　　1,882,910
TAP
Filed Sept. 6, 1928
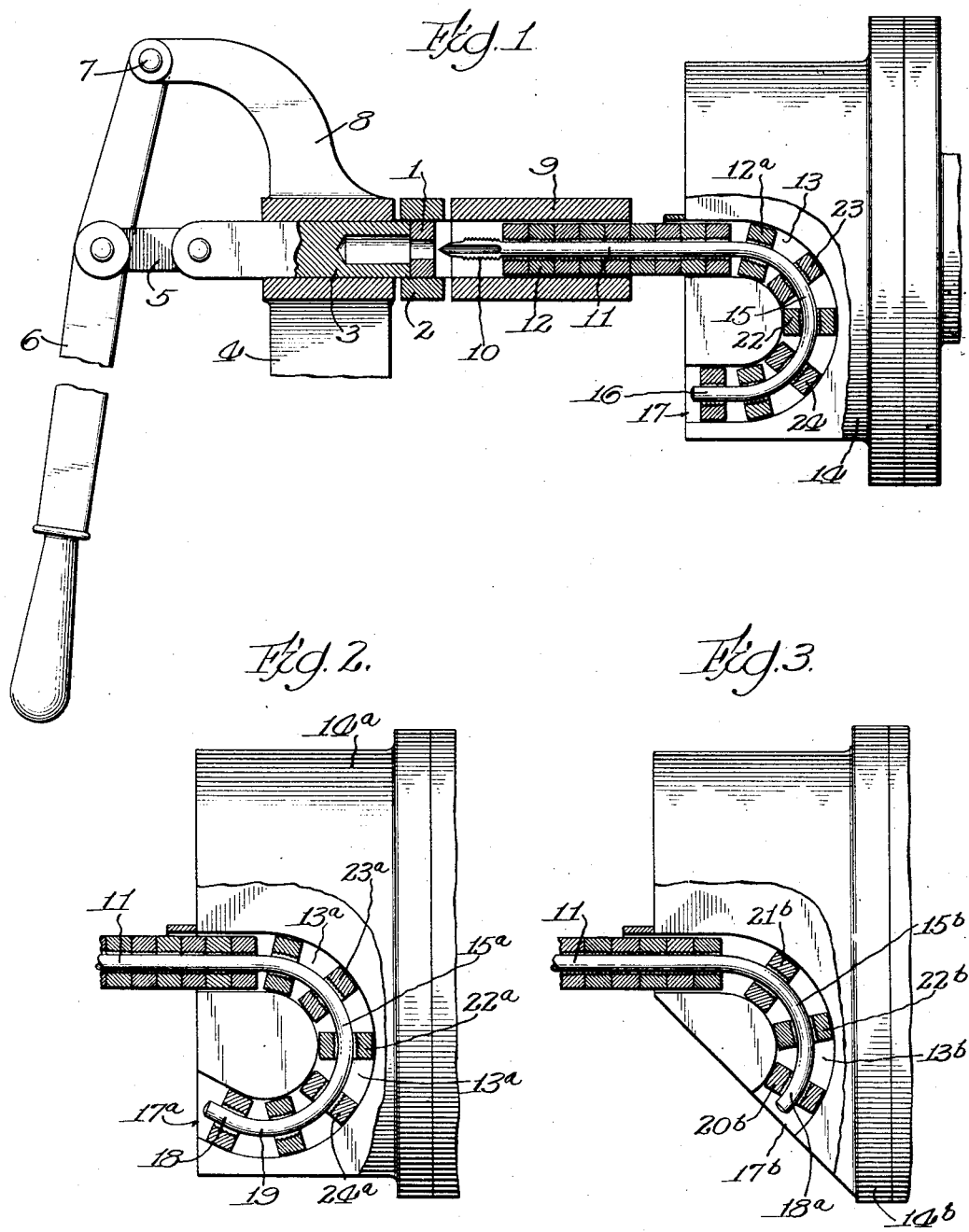
Inventor:
Ralph E. Rich
By: Wallace R. Lane Atty.

Patented Oct. 18, 1932

1,882,910

UNITED STATES PATENT OFFICE

RALPH E. RICH, OF CHICAGO, ILLINOIS, ASSIGNOR TO RICH TRUST, A TRUST OF MASSACHUSETTS

TAP

Application filed September 6, 1928. Serial No. 304,201.

The present invention relates to taps and tapping devices such as those for tapping nuts and the like.

It is an object of the present invention to provide a novel tap or tapping device for cutting internal threads in nuts or similar objects with greater accuracy than has heretofore been possible, and whereby a relative speed of rotation of the tap and nut holder may be had even in excess of any heretofore practically obtainable, as may be desired, without any stripping or damaging of the threads in the nuts or of the tap or tapping tool, thus doing away with all of the disadvantages of the devices heretofore used, and having many new advantages.

In a few specific embodiments illustrating the invention, is provided a novel tap shank along which the tapped nuts move, the shank being curved or bent with the discharge end portion or part thereof reflex or extending preferably in the same general direction as the entry end portion of the shank and passage in which the shank is located. The threading portion of the tap together with a portion of the shank is axial, and the discharge end portion of the shank is bent upon itself or reflexed. This disposition of the shank is such that it will permit the movement of the nuts along the same, first axially and then around the bent or curved portion thereof, and then to the discharge end portion. It will be understod that the discharge end or leg of the shank may be at any angle less than a right angle, such as 60 degrees, 45 degrees, 30 degrees, zero degrees (parallel) or minus 10 degrees, 20 degrees or more, or any intermediate angle, which is substantially less than a right angle. In this way centrifugal force tending to cause the nuts to move radially and empty the shank portion of the tap will be overcome or reduced to such an extent, that the nuts may be freely released one after the other by the pressure of the succeeding nuts being fed onto the train.

In an illustrative embodiment of my invention, the shank is curved or bent beyond 90 degrees with the discharge leg shorter than the other.

An advantage of the structure of this invention is such that with absence of intermediate nuts in the train, such as at the bend, any tendency to move the shank axially is met by an abutting of the inclined or oblique portion of the tail or discharge end portion of the shank, against the nut at that point, or if the latter nut be absent, but one is present at the bend, by a like abutment against such nut. Likewise, any tendency to canting or loss of axial alignment of the straight or tapping part of the shank will be met with by the curved parts of the shank laterally abutting the nut or nuts wherever they happen to be, thus holding the tapping portion in correct axial alignment.

In the form where the discharge end portion of the shank intersects a plane at right angle to the axial or straight portion of the tap regardless whether the discharge end portion is less than parallel to the axial portion, parallel to it, or even at a reflex angle, there is no tendency to bend the axial portion of the shank or swing it out of axial alignment, thus insuring accurate cutting of the tap.

Other advantages, capabilities, objects and features are comprehended by the invention, as will later appear and are inherently possessed thereby.

Referring to the drawing, Fig. 1 is a top plan view of an illustrative embodiment of the invention with parts in section; and Fig. 2 is a fragmentary view of an alternate form; and Fig. 3 is a similar view of a further alternate construction.

Referring more in detail to the drawing, the embodiment selected to illustrate the invention is shown with a nut blank 1 at the end of a chute 2 ready to be pushed by a pusher or plunger 3 slidable in a guide 4 forming a fixed part of the machine. The pusher is flexibly connected by way of a connecting rod or link 5 to a lever 6 having a fulcrum 7 on a bracket or arm 8 rigid with the guide 4 or other fixed part of the machine.

The pusher 3 acts to move the nut blank into a jaw 9 having an internal passage of the same cross-sectional shape and size as the perimeter of the nut blank, and to engage the blank with the tap 10 on the forward end of the shank 11. The blank, as it is being threaded passes along the tap 10 and thence to the straight portion of the shank 11. The threaded nuts, such as nuts 12 then train along in a line along the shank 11, as shown, each nut pushing the nut ahead of it and being pushed by the nut following it.

The shank extends into a curved or bent passage 13 formed in a holder or head 14, with a similarly curved or bent shank portion 15, the latter following the center line of the passage 13, as shown. The nuts, such as nuts 12$^a$ pass along the bent part 15 and the passage 13, as shown.

The jaw 9 and the holder or head 14 are relatively rotatable by either having the jaw stationary and the head rotatable or vice versa, or both rotatable in opposite directions, or at different speeds if both rotatable in the same direction, the speeds of rotation being variable at will.

In the form shown in Fig. 1, the shank portion 15 ends in a discharge end or tail 16 parallel to the shank portion 11, or the axis of rotation of either the jaw 9 or head 14, or both. The passage 13 ends in a discharge opening 17 which is parallel to the axis of rotation of the shank part 11. By having the tail part 16 parallel to the rotation axis, the cranking force applied laterally at 16 is delivered within a plane at right angle to such axis, hence avoiding any tendency to deliver the turning effort in such a manner that it might cause the shank to bend and hence break. Also it avoids the loss of axial alignment and corresponding inaccurate threading of the nuts.

In the form shown in Fig. 2, the tail part 18 continues at an angle, as a reflex angle to the axis, and also beyond the point 19 which is in parallelism with the axis of rotation. The same right angle cranking advantage is present in this form as in the one above described. The nuts are discharged through the opening 17$^a$ of the head 14$^a$ and from the passage 13$^a$, the latter being of the same curvature or shape as the shank portions 15$^a$ and 18, as clearly shown.

In the form shown in Fig. 3, the bent portion 15$^b$ of the shank has a shorter tail 18$^a$ ending at an acute angle to the rotative axis. The head 14$^b$ has a co-ordinately curved passage 13$^b$ ending in a discharge opening 17$^b$ which is in a plane transversely of or at an angle to the axis of rotation. In this case, the curved end portion tends to keep the shank portion in axial alignment regardless of the forces applied at the threading end as any tendency to transverse movement of the curved shank portion 15$^b$ is met by abutment against a nut, such as nut 20$^b$ or 21$^b$ which in turn react against the adjacent surfaces of the passage 13$^b$.

In all of the forms shown, if the push of the blank against the tap 10 be such as to tend to move the shank axially such tendency is met immediately by reaction of the nuts in the bend, such as nuts 22, 22$^a$, or 22$^b$, or the pair of nuts 23—24, or 23$^a$—24$^a$, or 21$^b$—20$^b$. A tendency to reverse axial movement is met in a similar manner.

In the case where the tap and shank tend to move sidewise or angularly out of axial alignment, such tendency is about some point in a curved passage, and is met or resisted by the nuts in such passage disposed at an angle to the axis of rotation. As for example, if the shank and tap tends to swing upward as viewed in the figures of the drawing, the nut 24 or those leading it will tend to be moved sidewise but this is prevented by their contacting the adjacent surfaces of the passage 13. Likewise, the nut 23 and those following it will act to prevent side movement of that part of the curved shank in that nut. The same applies to the nuts 23$^a$, 24$^a$, 21$^b$ and 20$^b$, in Figs. 2 and 3 of the drawings.

Hence, it is apparent from the above accurate tapping will result as shank of the tap cannot be deflected from axial alignment.

While I have herein described and upon the drawing shown a few illustrative embodiments of the invention, it is to be understood that the invention is not limited thereto but may comprehend other constructions, details, arrangements of parts, and features without departing from the spirit thereof.

Having thus disclosed the invention, I claim:

1. A tapping device comprising a shank, an end portion of said shank having threading means, the other end portion of said shank being reflexed and serving as the discharge end for threaded elements moved along said shank.

2. A tapping tool comprising a supporting means, and a shank having its ends pointing in the same general direction with respect to the supporting means, one of said ends having a threading means, and the other of said ends serving as the discharge terminal of the threaded elements as they travel along the shank.

3. A tap comprising a shank having a receiving end and a reflexed end, both projected forwardly from a normal rearward position, the receiving end being provided with threading means, the reflexed end serving as the discharge terminal for the threaded elements as they travel along the shank.

4. A tapping device comprising a shank, the forward end of the shank having a threading means, the other end of the shank being curved with the terminal thereof extending toward the threading end.

5. A tap comprising a shank, the forward end of the shank having a threading means, the other end of the shank curved with the terminal thereof extending toward the threading end and beyond a transverse plane passing through a point in said shank ahead of the curved part thereof.

6. A device for tapping nuts and the like, comprising a holder having a passage therein, a shank in said passage, the forward end of the shank having means for threading nuts, the other end of the shank being bent toward the threading end to discarge tapped nuts at the end of said passage.

7. A device for tapping nuts and the like, comprising a holder having a passage therein, said passage having an axial entry end portion and a discharge end portion which is disposed eccentrically with respect to said entry portion, said end portions being at an acute angle with relation to each other, a tap, and a tap shank in said passage.

8. A device for tapping nuts and the like comprising a head provided with a passage therethrough having an axial entry end portion and a reflexedly curved discharge end portion terminating laterally with respect to said entry end portion, both ends of said passage opening in the same face of said head, and a tap shank within said passage.

9. In a tapping device for nuts and the like, a head having a passage, said passage being bent upon itself to have its entry and discharge ends pointing in the same general direction a tap, and a tap shank in said passage for the moving therealong of threaded nuts.

10. In a tapping device for nuts and the like, a head having a passage therein, said passage being so bent upon itself as to have entry and discharge ends in the same face of the head, that portion of the pasage which terminates in said discharge end being disposed laterally with respect to that portion which leads inwardly from the entry end, and also converging toward said entry end, and a tap shank within said passage and conforming to the contour thereof, so as to guide threaded nuts in their travel through the passage.

11. In a tapping device for nuts and the like, a tap, a head having a reflexly bent passage therein, the entry end of said passage being in the axis of the head.

12. In a tapping device for nuts, a tap, a head having a reflexly bent passage therein, the entry end of said passage being in the axis of the head, and the discharge end of said passage extending beyond a transverse plane passing through a point in said axis, ahead of the curved part thereof.

In witness whereof, I hereunto subscribe my name to this specification.

RALPH E. RICH.